United States Patent
Park et al.

(10) Patent No.: US 10,165,505 B2
(45) Date of Patent: Dec. 25, 2018

(54) METHOD AND APPARATUS FOR CONTROLLING SCAN PERIOD IN WIRELESS COMMUNICATION SYSTEM

(71) Applicant: Samsung Electronics Co., Ltd., Suwon-si, Gyeonggi-do (KR)

(72) Inventors: Seong-Hee Park, Seoul (KR); Myoung-Hwan Lee, Suwon-si (KR); Do-Hy Hong, Seoul (KR); Chil-Youl Yang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/424,215

(22) Filed: Feb. 3, 2017

(65) Prior Publication Data

US 2017/0230902 A1 Aug. 10, 2017

(30) Foreign Application Priority Data

Feb. 4, 2016 (KR) ........................ 10-2016-0013910

(51) Int. Cl.
*H04W 48/16* (2009.01)
*H04W 48/10* (2009.01)
*H04W 52/02* (2009.01)

(52) U.S. Cl.
CPC ........... *H04W 48/16* (2013.01); *H04W 48/10* (2013.01); *H04W 52/0261* (2013.01);
(Continued)

(58) Field of Classification Search
CPC . H04W 48/16; H04W 48/10; H04W 52/0261; Y02B 60/50; Y02D 70/1264;
(Continued)

(56) References Cited

U.S. PATENT DOCUMENTS 8,706,032 B2 4/2014 Zhang et al.
8,873,418 B2 10/2014 Robinson et al.
(Continued)

FOREIGN PATENT DOCUMENTS

EP 1 549 094 A1 6/2005
EP 1 968 283 A1 9/2008
(Continued)

OTHER PUBLICATIONS

European Search Report dated Oct. 9, 2018, issued in European Application No. 17747795.7-1214 / 3375222.

*Primary Examiner* — Mong-Thuy T Tran
(74) *Attorney, Agent, or Firm* — Jefferson IP Law, LLP

(57) ABSTRACT

The present disclosure relates to a sensor network, machine type communication (MTC), machine-to-machine (M2M) communication, and technology for internet of things (IoT). The present disclosure may be applied to intelligent services based on the above technologies, such as smart home, smart building, smart city, smart car, connected car, health care, digital education, smart retail, security and safety services. A method includes determining whether a scan period of a first connectivity scheme is changeable based on a service discovered during the scan period of the first connectivity scheme, if the scan period of the first connectivity is changeable, detecting a state of a second connectivity scheme, and changing the scan period of the first connectivity scheme based on the detected state of the second connectivity scheme.

18 Claims, 9 Drawing Sheets

(52) U.S. Cl.
CPC .......... *Y02D 70/00* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/162* (2018.01); *Y02D 70/164* (2018.01); *Y02D 70/168* (2018.01); *Y02D 70/21* (2018.01); *Y02D 70/22* (2018.01); *Y02D 70/26* (2018.01)

(58) Field of Classification Search
CPC .... Y02D 70/168; Y02D 70/26; Y02D 70/142; Y02D 70/22; Y02D 70/21; Y02D 70/00; Y02D 70/1262; Y02D 70/144; Y02D 70/1244; Y02D 70/164; Y02D 70/1246; Y02D 70/162
USPC .......................................................... 455/434
See application file for complete search history.

(56) References Cited

U.S. PATENT DOCUMENTS

| | | | |
|---|---|---|---|
| 8,989,810 B2 | 3/2015 | Hsia et al. | |
| 9,503,969 B1* | 11/2016 | Zakaria | H04W 48/16 |
| 2003/0036354 A1 | 2/2003 | Lee et al. | |
| 2007/0047506 A1* | 3/2007 | Froehling | H04W 52/0216 |
| | | | 370/338 |
| 2007/0091847 A1 | 4/2007 | Lee | |
| 2007/0184835 A1 | 8/2007 | Bitran et al. | |
| 2007/0275746 A1 | 11/2007 | Bitran | |
| 2009/0003278 A1 | 1/2009 | Abdel-Kader et al. | |
| 2009/0068970 A1* | 3/2009 | Ahmed | H04W 48/16 |
| | | | 455/161.1 |
| 2010/0067416 A1* | 3/2010 | Gao | H04W 52/0274 |
| | | | 370/311 |
| 2010/0291921 A1* | 11/2010 | Ruuska | H04W 24/00 |
| | | | 455/426.1 |
| 2010/0322287 A1 | 12/2010 | Truong et al. | |
| 2012/0158839 A1* | 6/2012 | Hassan | H04W 8/005 |
| | | | 709/204 |
| 2013/0010766 A1* | 1/2013 | Sadek | H04W 72/1215 |
| | | | 370/336 |
| 2013/0148636 A1 | 6/2013 | Lum et al. | |
| 2014/0087752 A1* | 3/2014 | Zhu | H04W 24/00 |
| | | | 455/456.1 |
| 2014/0087785 A1 | 3/2014 | Smadi et al. | |
| 2014/0192681 A1* | 7/2014 | Hong | H04W 8/005 |
| | | | 370/254 |
| 2014/0221029 A1 | 8/2014 | Chen et al. | |
| 2014/0341108 A1 | 11/2014 | Desai et al. | |
| 2015/0024687 A1 | 1/2015 | Rawat et al. | |
| 2015/0133185 A1 | 5/2015 | Chen et al. | |
| 2015/0141045 A1 | 5/2015 | Qiu et al. | |
| 2015/0163743 A1* | 6/2015 | Narasimha | H04W 52/0254 |
| | | | 370/311 |
| 2015/0172906 A1* | 6/2015 | Terazaki | H04W 76/10 |
| | | | 455/434 |
| 2015/0271716 A1* | 9/2015 | Son | H04W 36/0055 |
| | | | 455/436 |
| 2015/0312857 A1* | 10/2015 | Kim | H04W 52/0222 |
| | | | 370/311 |
| 2016/0072855 A1* | 3/2016 | Palin | H04L 65/1069 |
| | | | 709/219 |
| 2017/0149486 A1* | 5/2017 | Hara | H04B 7/14 |
| 2017/0164291 A1* | 6/2017 | Ludwig | H04W 52/0255 |
| 2017/0201942 A1* | 7/2017 | Mathews | H04W 52/0216 |

FOREIGN PATENT DOCUMENTS

| | | |
|---|---|---|
| EP | 2 209 332 B1 | 1/2013 |
| JP | 2005-045368 A | 2/2005 |

* cited by examiner

METHOD AND APPARATUS FOR CONTROLLING SCAN PERIOD IN WIRELESS COMMUNICATION SYSTEM

CROSS-REFERENCE TO RELATED APPLICATION(S)

This application claims the benefit under 35 U.S.C. § 119(a) of a Korean patent application filed on Feb. 4, 2016 in the Korean Intellectual Property Office and assigned Serial number 10-2016-0013910, the entire disclosure of which is hereby incorporated by reference.

TECHNICAL FIELD

The present disclosure relates to a method and apparatus for controlling a scan period in a wireless communication system. More particularly, the present disclosure relates to a method and apparatus for adaptively controlling a scan period for detecting a short range communication signal in a wireless communication system.

BACKGROUND

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged.

As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Data which a user needs to store or maintain per use is exponentially increased according to implementation of IoT, so it becomes general to store data in a cloud storage managed and possessed by a hosting company instead of storing the data in a memory of a hardware with limited capacity.

Devices in which IoT is implemented support at least one connectivity scheme for a plurality of short range communications for a communication between things or devices. Here, a connectivity scheme may include a Bluetooth (BT) scheme, a Wi-Fi direct scheme, a peer to peer (P2P) scheme, a Bluetooth low energy (BLE) scheme, a Zigbee scheme, and/or the like which may use a part of an industrial scientific medical (ISM) band as a communication frequency band.

Further, according to implementation of IoT, a mobile device may be connected to one or more other devices based on at least one connectivity scheme supported in the mobile device, so a user of the mobile device can use a plurality of services. A mobile device may access an external device, be connected to the external device or control the external device, and/or detect whether there is the external device through at least one application which is being run on the mobile device without user's intervention. So, a plurality of connections which are based on a short range communication may occur in one mobile device. In this case, a scan operation of a connectivity scheme for connecting an external device is automatically run in a mobile device, so interference may occur in a connection of a service which is being used thereby performance of the service may be degraded.

So, there is a need for controlling a scan operation for a connectivity scheme which is automatically run by considering a service which is being used on a mobile device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for controlling a scan period in a wireless communication system.

Another aspect of the present disclosure is to provide a method and an apparatus for controlling a scan period for a mobile device to detect a signal for a short range communication in a wireless communication system.

Another aspect of the present disclosure is to provide a method and an apparatus for controlling a scan operation for detecting a signal for a short range communication by considering a service which is being used on a mobile device in a wireless communication system.

Another aspect of the present disclosure is to provide a method and an apparatus for adaptively controlling a scan period for detecting a signal for a short range communication by considering state information of a service which a mobile device is using, remaining battery of the mobile device, a use history for scan information of the mobile device, and/or the like in a wireless communication system.

In accordance with an aspect of the present disclosure, a method for controlling a scan period in a mobile device in a wireless communication system is provided. The method includes determining whether a scan period of a first connectivity scheme is changeable based on a service discovered during the scan period of the first connectivity scheme, if the scan period of the first connectivity is changeable, detecting a state of a second connectivity scheme, and changing the scan period of the first connectivity scheme based on the detected state of the second connectivity scheme.

In accordance with another aspect of the present disclosure, a mobile device in a wireless communication system is provided. The mobile device includes at least one processor configured to determine whether a scan period of a first connectivity scheme is changeable based on a service discovered during the scan period of the first connectivity scheme, to detect a state of a second connectivity scheme if the scan period of the first connectivity is changeable, and to change the scan period of the first connectivity scheme based on the detected state of the second connectivity scheme, and a transceiver configured to perform a scan operation under a control of the at least one processor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
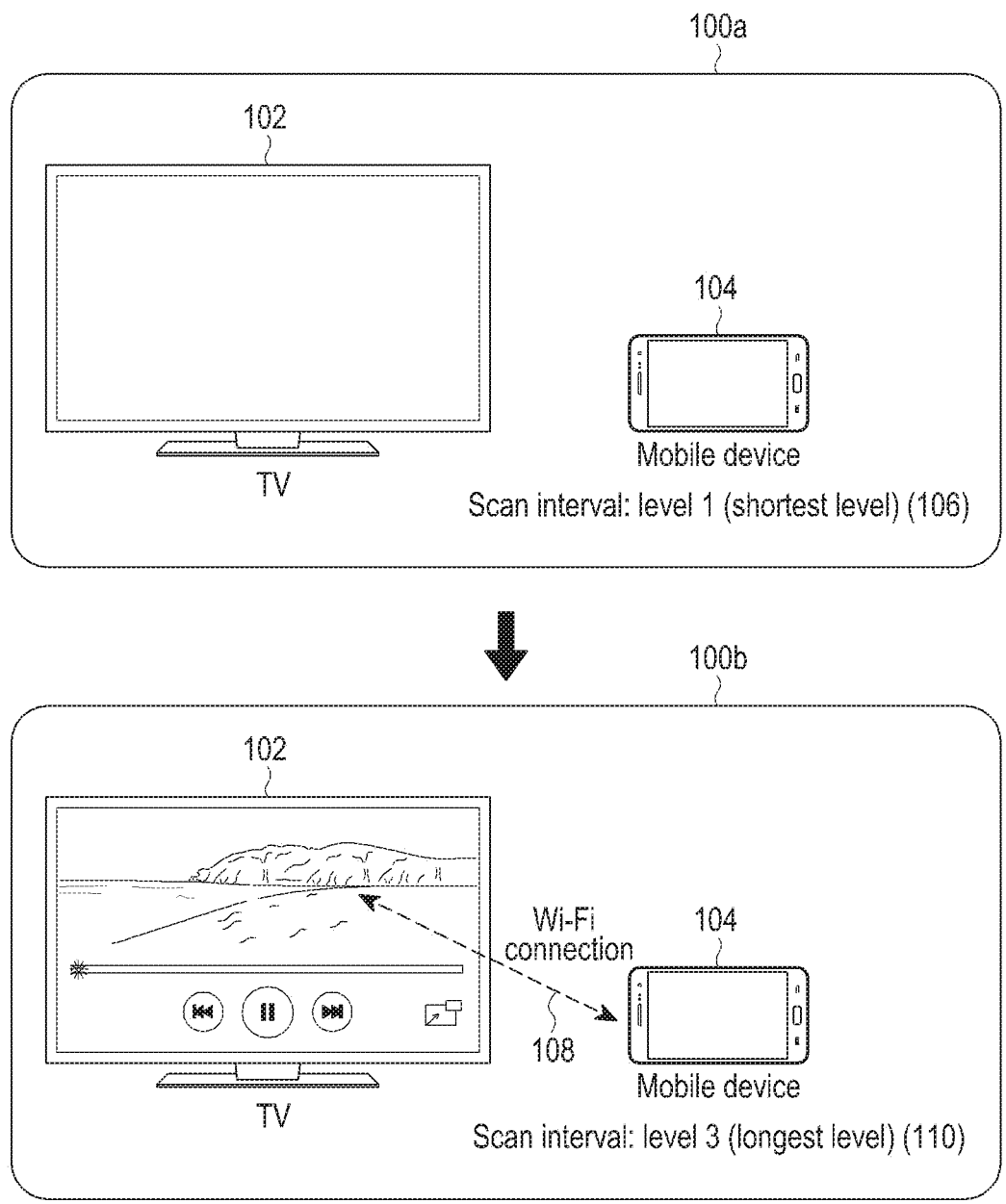
FIG. 1 schematically illustrates an example of a situation in which a mobile device redetermines a scan period in a wireless communication system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television, a digital versatile disc (DVD) player, an audio, a refrigerator, an air conditioner, a vacuum cleaner, an oven, a microwave oven, a washer, a dryer, an air purifier, a set-top box, a television (TV) box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

Hereinafter, a mobile device and devices connected to the mobile device according to an embodiment of the present disclosure may be any combination of the foregoing devices. In addition, it will be apparent to one having ordinary skill in the art that an electronic device according to various embodiments of the present disclosure is not limited to the foregoing devices.

An embodiment of the present disclosure provides a method and an apparatus for controlling a scan period in a wireless communication system.

An embodiment of the present disclosure provides a method and an apparatus for controlling a scan period for a mobile device to detect a signal for a short range communication in a wireless communication system.

An embodiment of the present disclosure provides a method and an apparatus for controlling a scan operation for detecting a signal for a short range communication by considering a service which is being used on a mobile device in a wireless communication system.

An embodiment of the present disclosure provides a method and an apparatus for adaptively controlling a scan period for detecting a signal for a short range communication by considering state information of a service which a mobile device is using, remaining battery of the mobile device, a use history for scan information of the mobile device, and/or the like in a wireless communication system.

According to various embodiments of the present disclosure, a mobile device may be an electronic device.

A mobile device according to an embodiment of the present disclosure supports at least one connectivity scheme for a short range communication. In various embodiments of the present disclosure, a connectivity scheme may include a Bluetooth (BT) scheme, a Wi-Fi direct scheme, a peer to peer (P2P) scheme, a Bluetooth low energy (BLE) scheme, a Zigbee scheme, and/or the like which may use a part of an industrial scientific medical (ISM) band as a communication frequency band.

In various embodiments of the present disclosure, in a case that a mobile device uses a plurality of connectivity schemes, it will be assumed that the plurality of connectivity schemes may use the same frequency band. In various embodiments of the present disclosure, in a case that a mobile device uses a plurality of connectivity schemes, it will be assumed that each of the plurality of connectivity schemes may perform a time division multiplexing (TDM) communication operation. In various embodiments of the present disclosure, in a case that a mobile device uses a plurality of connectivity schemes, it will be assumed that each of the plurality of connectivity schemes may perform a TDM communication operation on the same frequency band.

It will be assumed that a mobile device according to an embodiment of the present disclosure activates at least one of connectivity scheme as described above for performing a scan operation for a short range communication. So, a scan operation may be automatically run on the mobile device by a scan period of the activated connectivity scheme.

The mobile device performs a scan operation based on a predetermined scan period for a corresponding connectivity scheme. If a signal is detected during a corresponding predetermined scan period, a mobile device according to an embodiment of the present disclosure determines whether a scan period of a service which corresponds to the detected signal is changeable. If the scan period of the service which corresponds to the detected signal is changeable, a mobile device according to an embodiment of the present disclosure may redetermine a scan period for a connectivity scheme which is additionally usable in the mobile device (hereinafter, will be referred to as sub-connectivity scheme) based on one of or a combination of two or more of whether a device connected to the mobile device through a connectivity scheme which is currently being used (hereinafter, will be referred to as main connectivity scheme) exists, state information of the main connectivity scheme, remaining battery of the mobile device, a use history for scan information of the mobile device, and/or the like.

State information for a main connectivity scheme according to an embodiment of the present disclosure may include throughput of a corresponding connectivity scheme, a channel state, and/or the like. Here, throughput may be determined, for example, by comparing amount of data which is transmitted and received through a connection which corresponds to a corresponding connectivity scheme with a predetermined data threshold value. A channel state may be determined, for example, by comparing a transmission retry count as a count of a transmission retry operation which is performed if a disconnection situation occurs in a corresponding connection.

For convenience, it will be assumed that a scan operation for detecting a signal for a short range communication which is automatically run on a mobile device according to an embodiment of the present disclosure is a BLE scan operation. However, a scan operation according to an embodiment of the present disclosure is not limited to only a BLE scan operation, and a scan operation according to an embodiment of the present disclosure may be identically applied to a scan operation of a connectivity scheme used on a mobile device.

Hereinafter, in various embodiments of the present disclosure, a scan operation may include at least one of an operation of discovering a target which will be connected based on a connectivity scheme, e.g., an operation of discovering an external device in a mobile device, an accessing and connecting operation with the discovered external device, and an operation of transmitting and receiving a signal for a communication with the connected external device. In various embodiments of the present disclosure, a scan period includes a scan interval indicating a period by which a mobile device repetitively performs a scan operation and a scan window which corresponds to a time duration during which the mobile device performs a scan operation based on the scan interval.

An apparatus and method provided in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile Internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an Internet protocol television (IPTV), a moving picture experts group (MPEG) media transport (MMT) system and/or the like.

An example of a situation in which a mobile device redetermines a scan period in a wireless communication system according to an embodiment of the present disclosure will be described with reference to FIG. 1.

FIG. 1 schematically illustrates an example of a situation in which a mobile device redetermines a scan period in a wireless communication system according to an embodiment of the present disclosure.

Referring to FIG. 1, in example 100a, no external device is currently connected to a mobile device 104. Here, it will be assumed that a scan operation according to a preset connectivity scheme is being run for a connection with the external device on the mobile device 104. For example, it will be assumed that the scan operation which is being run on the mobile device 104 is a BLE scan operation which is based on a BLE scheme. In FIG. 1, a mobile device redetermines a scan period for a BLE scan operation in a wireless communication system, however, the mobile device 104 may perform a scan operation according to one of other connectivity schemes as well as the BLE scan operation.

Like this, when the mobile device 104 is running the BLE scan operation, the mobile device 104 may set a scan interval applied to the BLE scan operation for discovering external devices connectable to the mobile device 104 to a scan interval of the shortest level 106, e.g., level 1. Here, the scan interval applied to the BLE scan operation may be selected one of time durations which are set by default in the mobile device 104. Further, a time duration which corresponds to time which a user of the mobile device wants may be set as a level value of a scan interval.

For another example, the mobile device 104 may redetermine a scan period based on at least one of a scan window and a scan interval included in the scan period. For example, the mobile device 104 may set each of a scan window and a scan interval to a minimum value. For another example, the mobile device 104 may set a scan window to a maximum value, and set a scan interval to a minimum value.

It will be assumed that a connectable external device, e.g., a TV 102 is discovered in a scan interval of level 1.

The mobile device 104 performs a connecting operation with the TV 102, and may control services provided through the TV 102 if the mobile device 104 and the TV 102 are connected. For example, the mobile device 104 may perform a channel change operation, a volume up or volume down operation for the TV 102, and/or the like for the TV 102.

Meanwhile, it will be assumed that a main connectivity scheme between the mobile device 104 and the TV 102 is a Wi-Fi scheme. For convenience, in example 100b, the TV 102 currently connected to the mobile device 104. Here, a connection which is set up based on a main connectivity scheme will be referred to as a main connection. The mobile device 104 may set a scan interval of a BLE scheme for discovering external devices which are additionally connectable to the mobile device 104 to the longest level, e.g., level 3 110 order to minimize interference in a main connection 108.

For example, in FIG. 1, it will be assumed that a BLE scan interval may be set to one of levels 1 to 3, and a time duration is increased by a predetermined amount of time if a level is increased.

Alternatively, for another example, the mobile device 104 may redetermine a scan period based on at least one of a scan window and a scan interval included in the scan period. For example, the mobile device 104 may set a scan window to a minimum value, and set a scan interval to a maximum value.

In FIG. 1, a mobile device redetermines a BLE scan interval according that an external device is connected to the mobile device based on a main connectivity scheme, however, the mobile device may redetermine a BLE scan interval by additionally considering at least one of state information for a service which is being used in the mobile device and remaining battery of the mobile device, or by considering one of the state information for the service which is being used in the mobile device and the remaining battery of the mobile device.

An example of a situation in which a mobile device redetermines a scan period in a wireless communication system according to an embodiment of the present disclosure has been described with reference to FIG. 1, and an example of a change in throughput of a mobile device according to a change in a BLE scan interval in a wireless communication system according to an embodiment of the present disclosure will be described with reference to FIG. 2.

Figure 2:
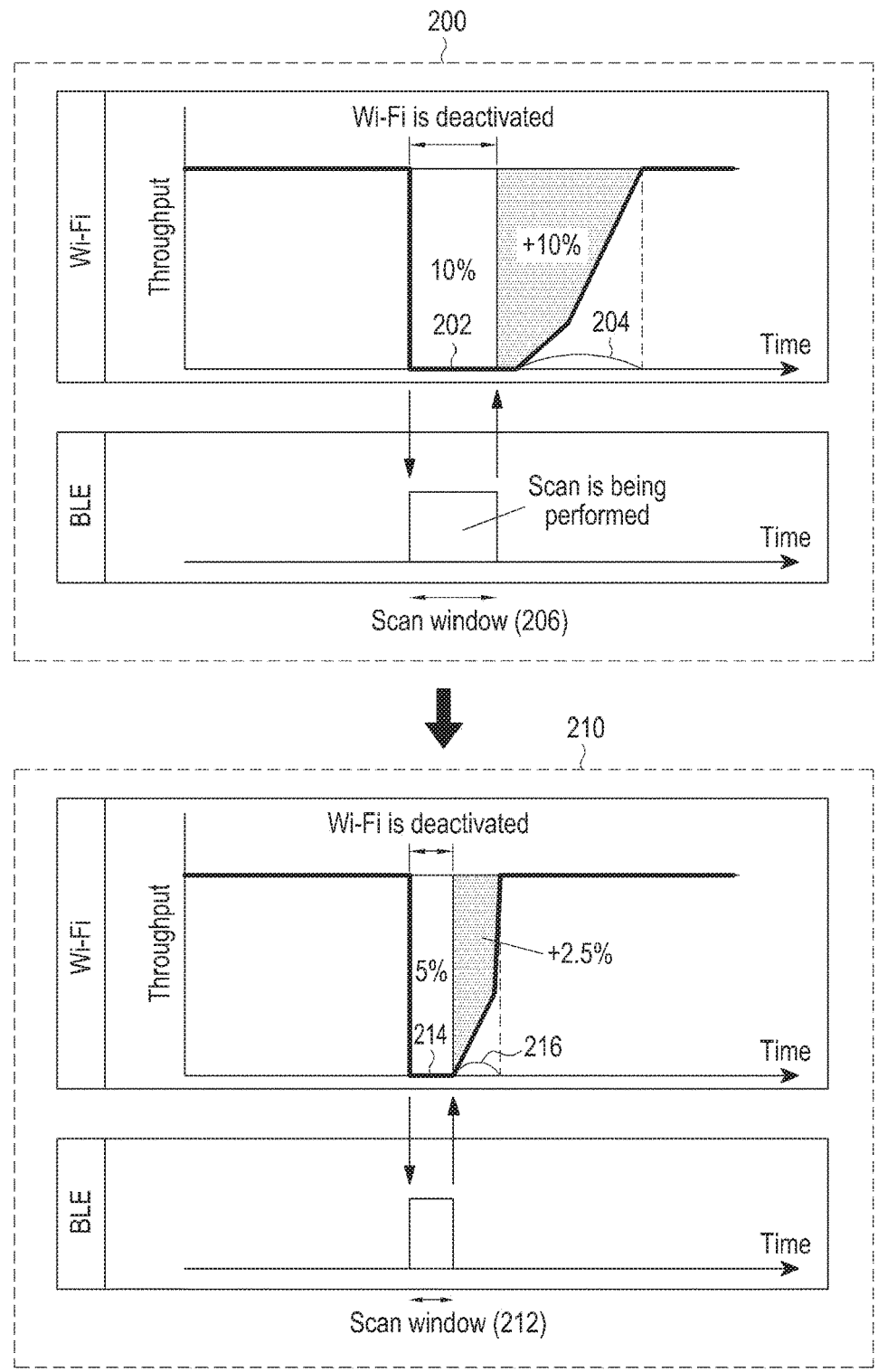
FIG. 2 schematically illustrates an example of a change in throughput of a mobile device according to a change in a Bluetooth low energy (BLE) scan interval in a wireless communication system according to an embodiment of the present disclosure.

FIG. 2 schematically illustrates an example of a change in throughput of a mobile device according to a change in a BLE scan interval in a wireless communication system according to an embodiment of the present disclosure.

Referring to FIG. 2, in example 200, while a BLE scan window 206 is activated in a mobile device, a Wi-Fi scheme which uses a frequency band identical to a frequency band used in a BLE scheme is deactivated. If the Wi-Fi scheme is activated at time at which the BLE scan window 206 is terminated, time duration 204 during which 10% throughput which is decreased on a Wi-Fi deactivated duration 202 is recovered occurs.

Compared to this, in example 210, while a BLE scan window 212 which is set to a time duration shorter than the BLE scan window 206 is activated, a deactivated duration 214 of the Wi-Fi scheme may be corresponded to the BLE scan window 212. So, 5% throughput decreased compared to throughput which is lost on the deactivated duration 202 of the Wi-Fi scheme which corresponds to the BLE scan window 206 is decreased. So, time duration 216 during which the Wi-Fi scheme is activated and throughput is recovered until normal throughput is also shorter than the time duration 204 during which the Wi-Fi scheme is activated at time at which the BLE scan window 206 is terminated and throughput is recovered until normal throughput.

As described in FIG. 1, if a BLE scan window is activated based on a BLE scan interval on a situation in which a mobile device is running a service through a main connectivity scheme, a Wi-Fi scheme which corresponds to the main connectivity scheme is deactivated. If the Wi-Fi scheme which has been deactivated during the BLE scan interval is activated again, delay time during which throughput is recovered occurs. So, a BLE scan period according to an embodiment of the present disclosure needs to be determined by considering delay time during which a Wi-Fi scheme which has been deactivated during a BLE scan interval is activated again and throughput is recovered.

So, in an embodiment of the present disclosure, a mobile device may redetermine a scan period of a sub-connectivity scheme with an external device by considering a state of a main connectivity scheme of the mobile device. For convenience, a connection which has been set up based on a sub-connectivity scheme will be referred to as sub connection.

For determining a BLE scan period according to an embodiment of the present disclosure, if a signal is detected during a BLE scan period, it needs to be determined whether a BLE scan period of a service which corresponds to the signal is changeable. For example, if the service which corresponds to the detected signal is a real-time service which needs to support data transmission and reception real time such as a multimedia streaming service, an emergency call, and/or the like, the BLE scan period of the service may not be changed.

So, in an embodiment of the present disclosure, a mobile device may change a BLE scan period if a real-time service is not used in a sub-connection. Specially, a BLE scan period according to an embodiment of the present disclosure may be changed to one of predetermined levels as described in FIG. 1. And, at least one of a BLE scan interval and a BLE scan window may be changed according to the changed BLE scan period. Further, a mobile device may stop temporarily a scan operation which corresponds to a BLE scan period which is being run or restart the scan operation which corresponds to the BLE scan period which has been temporarily stopped.

A criterion for changing a BLE scan period according to an embodiment of the present disclosure may be determined based on one of state information for a main connectivity scheme of a mobile device, battery power of the mobile device, and a use history for scan information of the mobile device, or based on a combination of two or more of the state information for the main connectivity scheme of the mobile device, the battery power of the mobile device, and the use history for the scan information of the mobile device. Here, the state information for the main connectivity scheme may include throughput of a main connection, amount of scanned data, channel state, and/or the like. Further, amount of data detected during a scan period, and importance of the detected data may be used as a criterion for changing a BLE scan period according to an embodiment of the present disclosure.

An example of a change in throughput of a mobile device according to a change in a BLE scan interval in a wireless communication system according to an embodiment of the present disclosure has been described with reference to FIG. 2, and an example of a process of redetermining a BLE scan period in a mobile device in a wireless communication system according to an embodiment of the present disclosure will be described with reference to FIG. 3.

Figure 3:
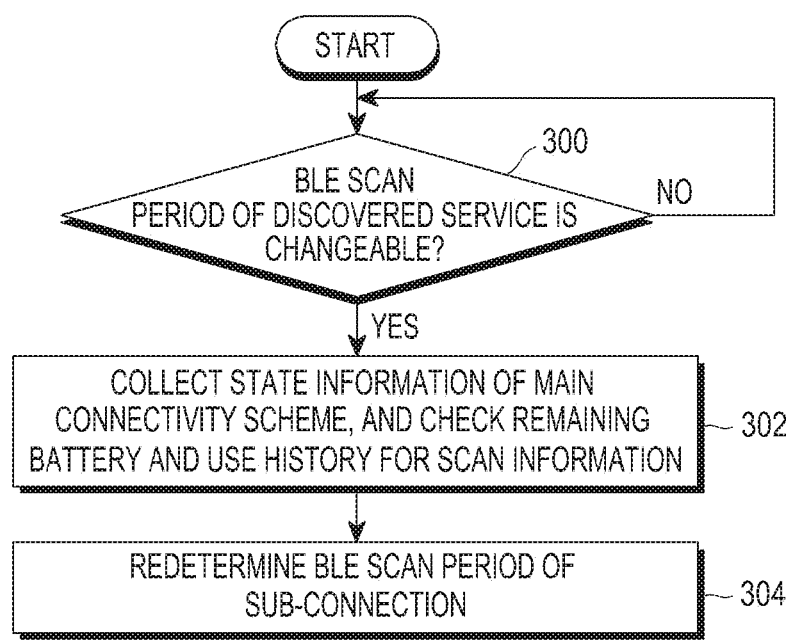
FIG. 3 schematically illustrates an example of a process of redetermining a BLE scan period in a mobile device in a wireless communication system according to an embodiment of the present disclosure.

FIG. 3 schematically illustrates an example of a process of redetermining a BLE scan period in a mobile device in a wireless communication system according to an embodiment of the present disclosure.

Referring to FIG. 3, for convenience, it will be assumed that a mobile device has activated a BLE scheme.

After a connectable service is discovered through a BLE scan operation, a mobile device determines whether a BLE scan period of the discovered service is changeable at operation 300. If the discovered service is a real-time service, the mobile device determines to maintain the BLE scan period of the discovered service and waits for detection of a signal which corresponds to a service of which a BLE scan period is changeable.

If the discovered service is not the real-time service, the mobile device proceeds to operation 302 in order to determine criteria for redetermining a BLE scan period. The mobile device collects state information of a main connectivity scheme, and checks remaining battery, a use history for scan information, and/or the like according to an embodiment of the present disclosure at operation 302 and proceeds to operation 304. The mobile device redetermines a BLE scan period of a sub-connection corresponding to a predetermined criterion based on the collected state information of the main connectivity scheme, the remaining battery, the use history for the scan information, and/or the like. Criteria for redetermining a BLE scan period of a sub-connection in a mobile device will be described below, and a detailed description thereof will be omitted herein.

Although FIG. 3 illustrates an example of a process of redetermining a BLE scan period in a mobile device in a wireless communication system according to an embodiment of the present disclosure, various changes could be made to FIG. 3. For example, although shown as a series of operations, various operations in FIG. 3 could overlap, occur in parallel, occur in a different order, or occur multiple times.

An example of a process of redetermining a BLE scan period in a mobile device in a wireless communication system according to an embodiment of the present disclosure has been described with reference to FIG. 3, and an example of a situation in which a mobile device redetermines a BLE scan period in a wireless communication system according to an embodiment of the present disclosure will be described with reference to FIG. 4A.

Figure 4A:
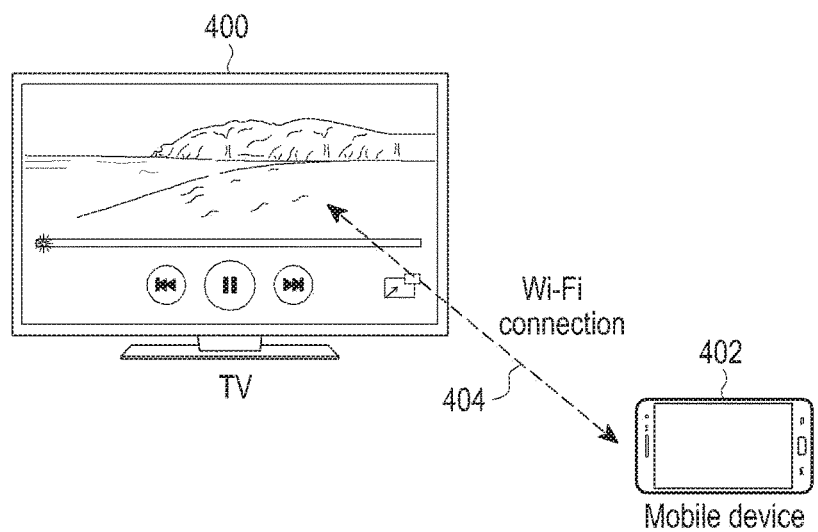
FIG. 4A schematically illustrates an example of a situation in which a mobile device redetermines a BLE scan period in a wireless communication system according to an embodiment of the present disclosure.

FIG. 4A schematically illustrates an example of a situation in which a mobile device redetermines a BLE scan period in a wireless communication system according to an embodiment of the present disclosure.

Referring to FIG. 4A, it will be assumed that a mobile device 402 has activated a connectivity scheme, e.g., a Wi-Fi scheme, with an external device. In FIG. 4A, it will be assumed that a user is playing a moving picture on the mobile device 402. In this case, the mobile device 402 and the TV 400 are located within a preset distance, so the mobile device 402 may detect a device supporting a Wi-Fi scheme, e.g., the TV 400 and display a screen indicating that the TV 400 which is connectable based on the Wi-Fi scheme has been detected on a display of the mobile device 402. For example, the screen may be implemented with a form of an icon or a pop-up window expressing the TV 400 which is connectable to the mobile device 402 based on the Wi-Fi scheme, for example, an icon or a pop-up window expressing a model name of the TV 400, and/or the like.

In FIG. 4A, it will be assumed that the user selects a connection with the TV 400 through the icon or the pop-up window which is displayed on the display of the mobile device 402. That is, in FIG. 4A, it will be assumed that the mobile device 402 detects that the connection between the mobile device 402 and the TV 400 is selected. It will be assumed that a BLE scheme is activated for discovering a target for a sub-connection in the mobile device 402 while the mobile device 402 and the TV 400 maintain a main connection through the Wi-Fi scheme.

Since the BLE scheme is activated for discovering the target for the sub-connection, the mobile device 402 performs a BLE scan operation based on a predetermined BLE scan period. At this time, it will be assumed that a criterion for redetermining a BLE scan period is throughput of the Wi-Fi scheme as a main connectivity scheme. For example, it will be assumed that the BLE scan period is determined as one of three levels, and a level 2 is a default BLE scan period. Further, for example, it will be assumed that the more increased a level is, the more increased, a BLE scan interval is. Alternatively, it will be assumed that the more increased a level is, the more increased, one of a BLE scan interval or a BLE scan window is, or the more decreased the level is, the more decreased, one of the BLE scan interval or the BLE scan window is.

In an embodiment in FIG. 4A, the mobile device 402 compares throughput of a Wi-Fi connection 404 between the mobile device 402 and the TV 400 as a main connection with threshold throughput by a predetermined period. If the throughput of the Wi-Fi connection 404 is greater than or equal to the threshold throughput, a possibility that relatively large interference may occur due to a BLE scan operation is high, for example, a possibility that interference greater than or equal to threshold interference may occur due to the BLE scan operation is high, so the mobile device 402 may increase a BLE scan period from a default level by a preset level, e.g., one level. If the throughput of the Wi-Fi connection 404 is less than the threshold throughput, a possibility that relatively large interference may occur due to the BLE scan operation is relatively low, for example, a possibility that interference greater than or equal to threshold interference may occur due to the BLE scan operation is low, so the mobile device 402 may decrease the BLE scan period from the default level by a preset level, e.g., one level.

An example of a situation in which a mobile device redetermines a BLE scan period in a wireless communication system according to an embodiment of the present disclosure has been described with reference to FIG. 4A, and another example of a situation in which a mobile device redetermines a BLE scan period in a wireless communication system according to an embodiment of the present disclosure will be described with reference to FIG. 4B.

Figure 4B:
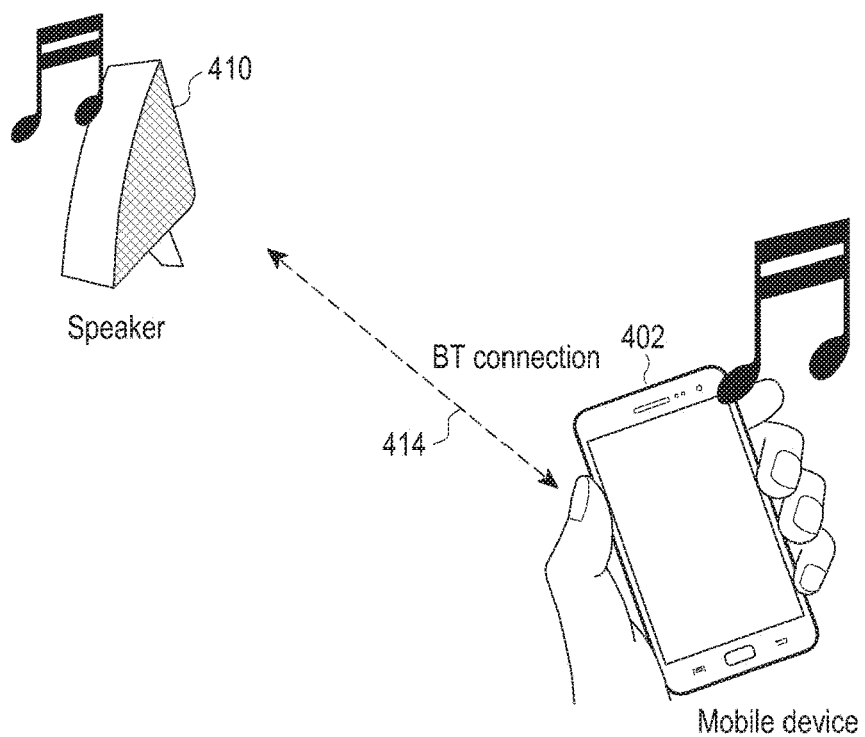
FIG. 4B schematically illustrates another example of a situation in which a mobile device redetermines a BLE scan period in a wireless communication system according to an embodiment of the present disclosure.

FIG. 4B schematically illustrates another example of a situation in which a mobile device redetermines a BLE scan period in a wireless communication system according to an embodiment of the present disclosure.

Referring to FIG. 4B, it will be assumed that a mobile device 402 has activated a connectivity scheme, e.g., a BT scheme, with an external device. In FIG. 4B, it will be assumed that a user is playing a music on the mobile device 402. In this case, the mobile device 402 and a device supporting the BT scheme, e.g., the speaker 410 are located within a preset distance, so the mobile device 402 may detect the speaker 410 and display a screen indicating that the speaker 410 has been detected on a display of the mobile device 402. For example, the screen may be implemented with a form of an icon or a pop-up window expressing the speaker 410 which is connectable to the mobile device 402 based on the BT scheme, for example, an icon or a pop-up window expressing a model name of the speaker 410, and/or the like.

In FIG. 4B, it will be assumed that the user selects a connection with the speaker 410 through the icon or the pop-up window which is displayed on the display of the mobile device 402. That is, in FIG. 4B, it will be assumed that the mobile device 402 detects that the connection between the mobile device 402 and the speaker 410 is selected. It will be assumed that the mobile device 402 and the speaker 410 maintain a main connection which corresponds to the BT scheme, and the mobile device 402 activates the BT scheme for a sub-connection. So, the mobile device 402 performs a BT scan operation based on a predetermined BT scan period. At this time, it will be assumed that the BT scan period is adjusted to a preset level according to throughput of a BT connection as a main connection.

In FIG. 4B, it will be assumed that the BT scan period is determined as one of three levels, and a level 2 is a default BT scan period. Further, in FIG. 4B, for example, it will be assumed that the more increased a level is, the more increased, a BT scan interval is. Alternatively, it will be assumed that the more increased a level is, the more increased, one of a BT scan interval or a BT scan window is, or the more decreased the level is, the more decreased, one of the BT scan interval or the BT scan window is.

In an embodiment in FIG. 4B, the mobile device 402 compares throughput of the BT connection 414 between the mobile device 402 and the speaker 410 as a main connection with preset threshold throughput by a predetermined period. If the throughput of the BT connection 414 is greater than or equal to the threshold throughput, a possibility that relatively large interference may occur due to a BT scan operation is high, for example, a possibility that interference greater than or equal to threshold interference may occur due to the BT scan operation is high, so the mobile device 402 may increase a BT scan period from a default level by a preset level, e.g., one level.

If the throughput of the BT connection 414 is less than the threshold throughput, a possibility that relatively large interference may occur due to the BT scan operation is relatively low, for example, a possibility that interference greater than or equal to threshold interference may occur due to the BT scan operation is low, so the mobile device 402 may decrease a BT scan period from a default level by a preset level, e.g., one level.

In FIGS. 4A and 4B, an operation of redetermining a scan period in a mobile device, a criterion used for redetermining a scan period, and a level used for changing a scan period are only examples, so an operation of redetermining a scan period in a mobile device, a criterion used for redetermining a scan period, and a level used for changing a scan period according to an embodiment of the present disclosure may be implemented with various combinations and various levels.

Operations of redetermining a BLE scan period based on other examples of a criterion for a mobile device to control a BLE scan period in a wireless communication system according to an embodiment of the present disclosure will be described with reference to FIGS. 5A to 5C, and 6.

Another example of a process of redetermining a BLE scan period in a mobile device in a wireless communication system according to an embodiment of the present disclosure will be described with reference to FIG. 5A.

Figure 5A:
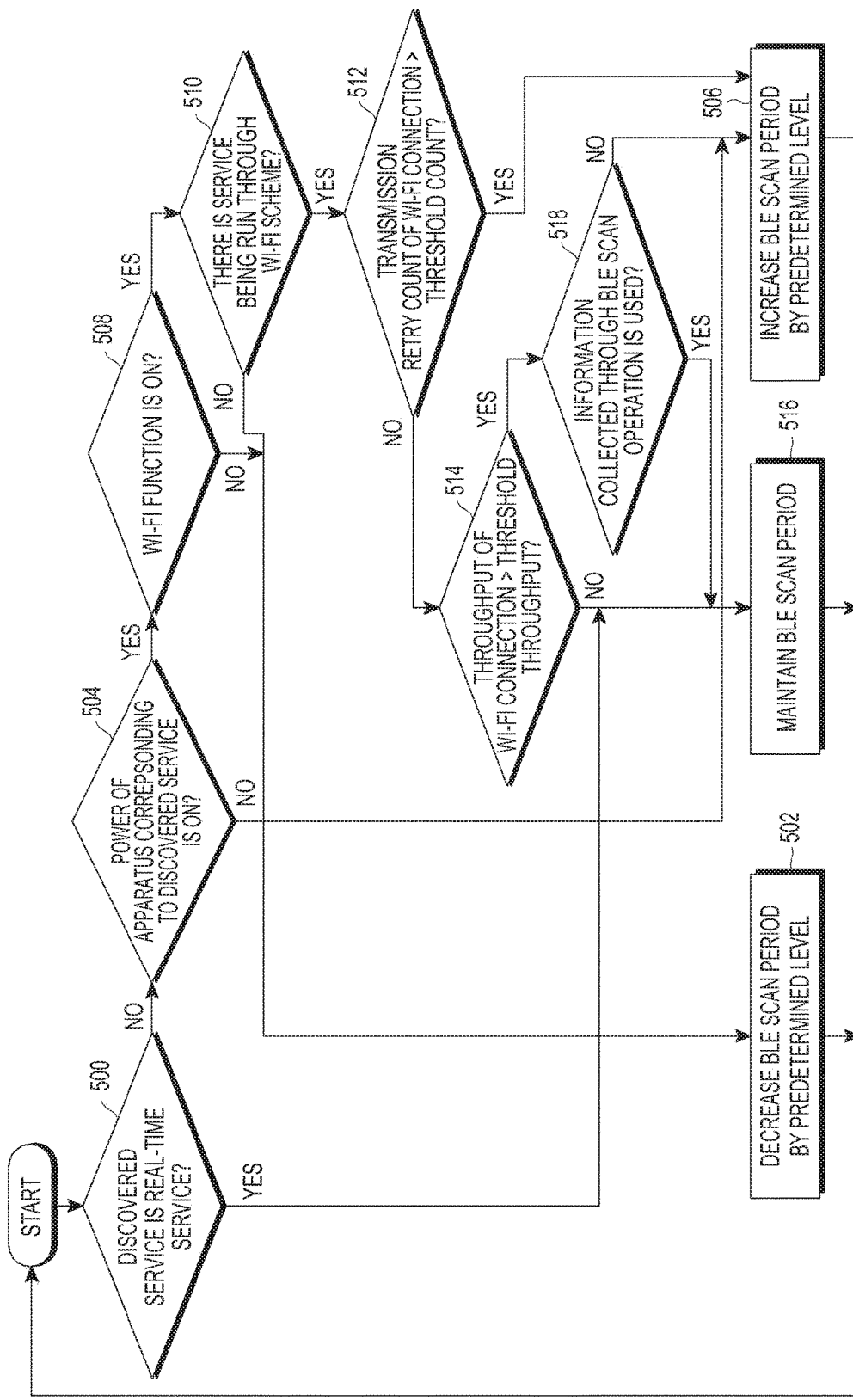
FIG. 5A schematically illustrates another example of a process of redetermining a BLE scan period in a mobile device in a wireless communication system according to an embodiment of the present disclosure.

FIG. 5A schematically illustrates another example of a process of redetermining a BLE scan period in a mobile device in a wireless communication system according to an embodiment of the present disclosure.

Referring to FIG. 5A, it will be noted that a process of redetermining a BLE scan period in a mobile device in FIG. 5A is a process of redetermining a BLE scan period in a mobile device in a case that the mobile device uses whether there is a service which is being running through a Wi-Fi scheme, throughput of a Wi-Fi connection, a transmission retry count of a Wi-Fi connection, and whether information collected during a BLE scan operation is used as a criterion for redetermining a BLE scan period upon determining the BLE scan period.

In FIG. 5A, after a connectable service is discovered through on a BLE scan operation, a mobile device determines whether the discovered service is a real-time service in order to determine whether a BLE scan period of the discovered service is changeable at operation 500. If the discovered service is the real-time service, the mobile device proceeds to operation 516. The mobile device maintains the BLE scan period at operation 516.

If the discovered service is not the real-time service, the mobile device proceeds to operation 504. The mobile device determines whether power of an apparatus which corresponds to the discovered service is on at operation 504. For example, the apparatus which corresponds to the discovered service may include a display, a speaker, and/or the like equipped in the mobile device. If the power of the apparatus which corresponds to the discovered service is off, the mobile device determines not to use the apparatus which corresponds to the discovered service, and proceeds to operation 506. The mobile device increases a BLE scan period by a predetermined level, e.g., one level thereby the BLE scan period is longer than a BLE scan period which is currently set. In an embodiment of the present disclosure as shown in FIG. 5A, it will be assumed that a BLE scan period is set to level 2 among predetermined 3 levels as a default BLE scan period, and the more increased a level is, the loner a BLE scan period is.

If the power of the apparatus which corresponds to the discovered service is on, the mobile device proceeds to operation 508. The mobile device determines whether a main connectivity scheme, e.g., a Wi-Fi scheme is on, that is, whether a Wi-Fi function is activated at operation 508. If the Wi-Fi scheme is not on, that is, if the Wi-Fi function is off, the mobile device proceeds to operation 502. The mobile device decreases a BLE scan period by a predetermined level, e.g., one level thereby the BLE scan period is shorter than the BLE scan period which is currently set.

If the Wi-Fi scheme is on, the mobile device proceeds to operation 510. The mobile device determines whether there is a service which is being run through the Wi-Fi scheme at operation 510. If there is no service which is being run through the Wi-Fi scheme, the mobile device proceeds to operation 502.

If there is the service which is being run through the Wi-Fi scheme, the mobile device proceeds to operation 512 in order to check a channel state of a Wi-Fi connection. The mobile device is connected through the Wi-Fi scheme, and determines whether a transmission retry count of the Wi-Fi connection is greater than a predetermined threshold count at operation 512. If the transmission retry count of the Wi-Fi connection is greater than the predetermined threshold count, the mobile device determines that the channel state of the Wi-Fi connection is not good and proceeds to operation 506. The mobile device increases a BLE scan period by a predetermined level, e.g., one level thereby the BLE scan period is longer than a BLE scan period which is currently set at operation 506.

Although not shown in FIG. 5A, if the transmission retry count of the Wi-Fi connection is greater than the predetermined threshold count, the mobile device may proceed to operation 518, determine whether information collected through a BLE scan operation while a previous Wi-Fi connection is maintained is used at operation 518, and determine a BLE scan period based on the determined result.

If the transmission retry count of the Wi-Fi connection less than or equal to the predetermined threshold count, the mobile device proceeds to operation 514. The mobile device determines whether throughput of the Wi-Fi connection is greater than predetermined threshold throughput at operation 514. For example, if the mobile device performs a download/upload operation through the Wi-Fi connection, throughput of the Wi-Fi connection may be greater than or equal to the predetermined threshold throughput. That is, operation 514 is for determining whether the throughput of the Wi-Fi connection is increased.

If the throughput of the Wi-Fi connection is less than or equal to the predetermined threshold throughput, the mobile device proceeds to operation 516. The mobile device maintains a BLE scan period at operation 516. For another example, if the throughput of the Wi-Fi connection is equal to the predetermined threshold throughput, the mobile device may decrease a BLE scan period by a predetermined level, e.g., one level in order to decrease interference due to a BLE scan operation.

If the throughput of the Wi-Fi connection is greater than the predetermined threshold throughput, the mobile device proceeds to operation 518. The mobile device determines whether information collected through a BLE scan operation while a previous Wi-Fi connection is maintained is used at operation 518. If the information collected through a BLE scan operation while a previous Wi-Fi connection is maintained is used, the mobile device proceeds to operation 516. The mobile device maintains a BLE scan period at operation 516.

If the information collected through the BLE scan operation while the previous Wi-Fi connection is maintained is not used, the mobile device determines that a possibility that the information collected through the BLE scan operation while the previous Wi-Fi connection is maintained is not used is high, and proceeds to operation 506. The mobile device may set a BLE scan period to a BLE scan period which is increased by a predetermined level, e.g., one level compared to a currently set BLE scan period.

Although FIG. 5A illustrates another example of a process of redetermining a BLE scan period in a mobile device in a wireless communication system according to an embodiment of the present disclosure, various changes could be made to FIG. 5A. For example, although shown as a series of operations, various operations in FIG. 5A could overlap, occur in parallel, occur in a different order, or occur multiple times.

Another example of a process of redetermining a BLE scan period in a mobile device in a wireless communication system according to an embodiment of the present disclosure has been described with reference to FIG. 5A, and still another example of a process of redetermining a BLE scan period in a mobile device in a wireless communication system according to an embodiment of the present disclosure will be described with reference to FIG. 5B.

Figure 5B:
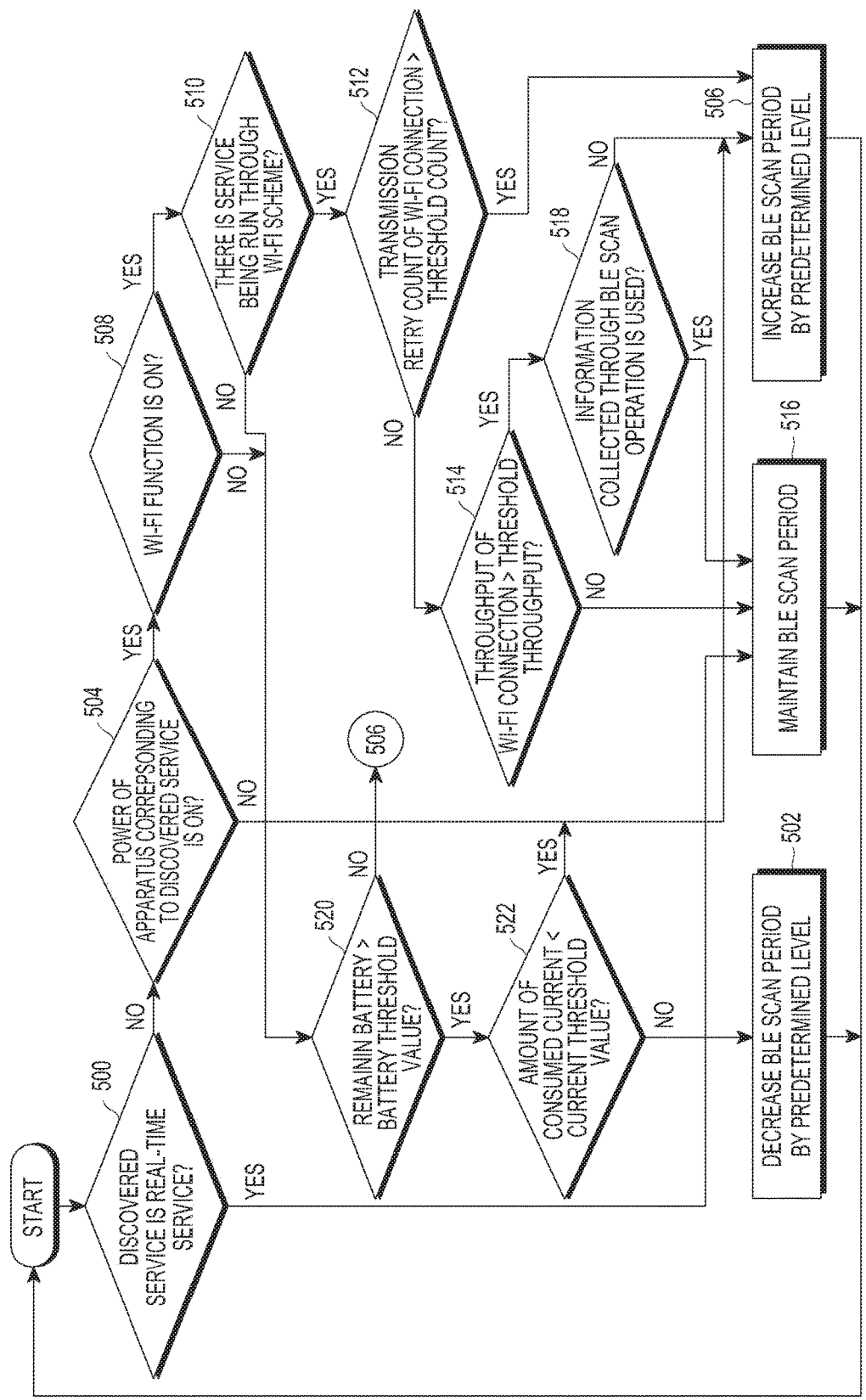
FIG. 5B schematically illustrates still another example of a process of redetermining a BLE scan period in a mobile device in a wireless communication system according to an embodiment of the present disclosure.

FIG. 5B schematically illustrates still another example of a process of redetermining a BLE scan period in a mobile device in a wireless communication system according to an embodiment of the present disclosure.

Referring to FIG. 5B, an embodiment in FIG. 5B additionally considers remaining battery and consumed current of a mobile device as well as criteria considered as criteria for redetermining a BLE scan period when determining a BLE scan period in a process of redetermining a BLE scan period in FIG. 5A.

In FIG. 5B, operations 500 to 510 are the same as FIG. 5A, and a detailed description thereof will be omitted herein.

If there is no service which is being run through the Wi-Fi scheme, the mobile device proceeds to operation 520. The mobile device determines whether remaining battery of the mobile device is greater than a predetermined battery threshold value at operation 520. If the remaining battery of the mobile device is less than or equal to the predetermined battery threshold value, the mobile device proceeds to operation 506. The mobile device increases a BLE scan period by a predetermined level, e.g., one level thereby the BLE scan period is longer than a BLE scan period which is currently set in order to minimize power consumption of the mobile device at operation 506.

If the remaining battery of the mobile device is greater than the predetermined battery threshold value, the mobile device proceeds to operation 522. Here, operation 522 is an operation of determining whether consumed current is temporarily increased due to an arbitrary operation in a case that the mobile device performs the arbitrary operation. The mobile device determines whether amount of consumed current of the mobile device is less than predetermined current threshold value at operation 522. If the amount of the consumed current of the mobile device is greater than or equal to the predetermined current threshold value, the mobile device determines that consumed current is temporarily increased due to the arbitrary operation, and proceeds to operation 502.

If the amount of the consumed current of the mobile device is less than the predetermined current threshold value, the mobile device determines that consumed current is not temporarily increased due to the arbitrary operation, and proceeds to operation 516.

Other operations which are not described in FIG. 5B may be the same as or similar to operations which have been described in FIG. 5A, so a detailed description thereof will be omitted herein.

Although FIG. 5B illustrates still another example of a process of redetermining a BLE scan period in a mobile device in a wireless communication system according to an embodiment of the present disclosure, various changes could be made to FIG. 5B. For example, although shown as a series of operations, various operations in FIG. 5B could overlap, occur in parallel, occur in a different order, or occur multiple times.

Still another example of a process of redetermining a BLE scan period in a mobile device in a wireless communication system according to an embodiment of the present disclosure has been described with reference to FIG. 5B, and still another example of a process of redetermining a BLE scan period in a mobile device in a wireless communication system according to an embodiment of the present disclosure will be described with reference to FIG. 5C.

Figure 5C:
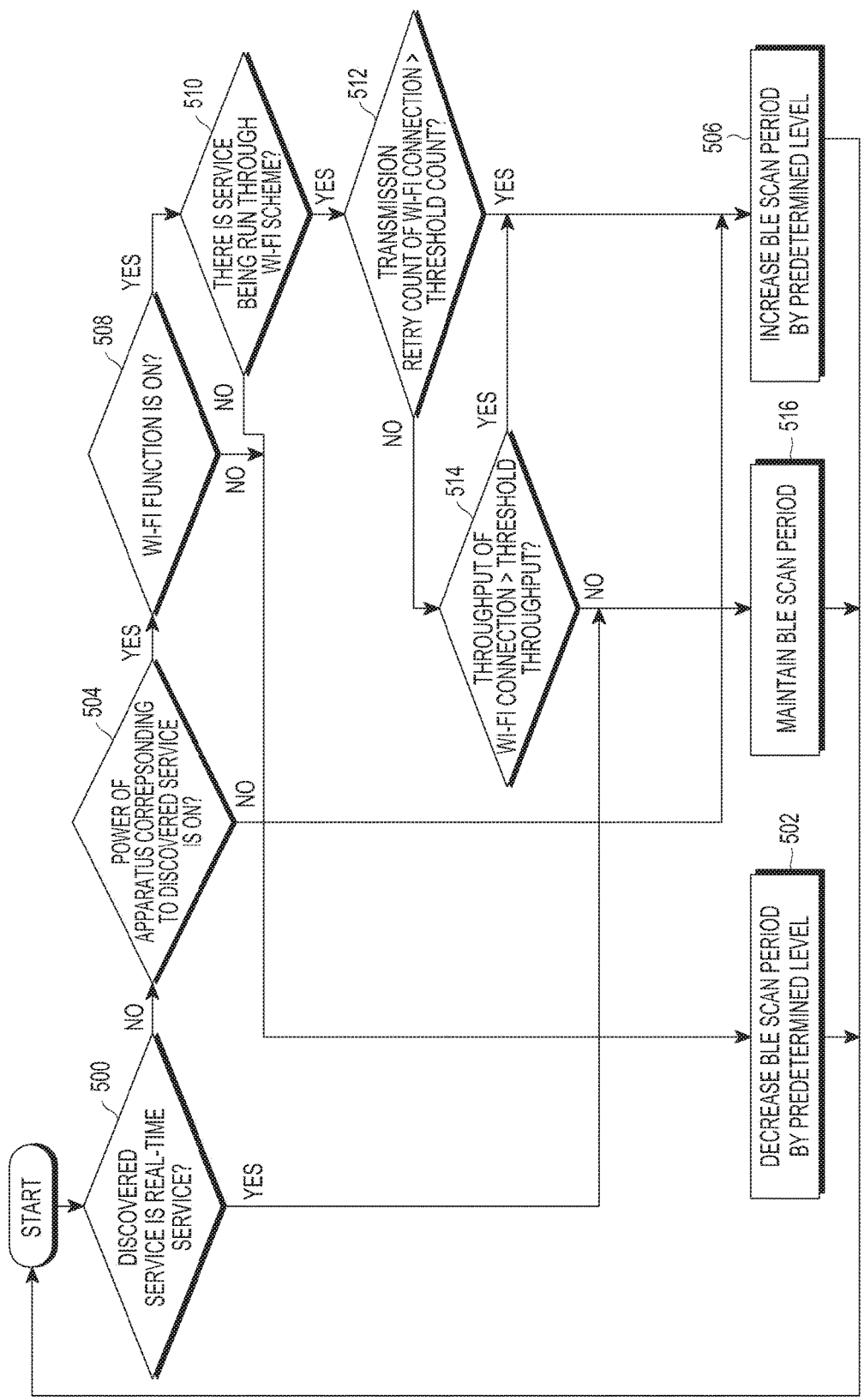
FIG. 5C schematically illustrates still another example of a process of redetermining a BLE scan period in a mobile device in a wireless communication system according to an embodiment of the present disclosure.

FIG. 5C schematically illustrates still another example of a process of redetermining a BLE scan period in a mobile device in a wireless communication system according to an embodiment of the present disclosure.

Referring to FIG. 5C, an embodiment in FIG. 5C additionally considers whether there is a service which is being run through a Wi-Fi connection, throughput of the Wi-Fi connection, and a transmission retry count of the Wi-Fi connection as well as criteria considered as criteria for redetermining a BLE scan period when determining the BLE scan period in a process of redetermining a BLE scan period in FIG. 5A.

In FIG. 5C, operations 500 to 512 are the same as FIG. 5A, so a detailed description thereof will be omitted herein.

A mobile device determines whether throughput of a Wi-Fi connection is greater than a predetermined threshold throughput at operation 514. If the throughput of the Wi-Fi connection is less than or equal to the predetermined threshold throughput, the mobile device proceeds to operation 516. The mobile device maintains a BLE scan period at operation 516.

If the throughput of the Wi-Fi connection is greater than the predetermined threshold throughput, the mobile device proceeds to operation 506. The mobile device increases a BLE scan period by a predetermined level, e.g., one level thereby the BLE scan period is longer than a BLE scan period which is currently set.

Other operations which are not described in FIG. 5C may be the same as or similar to operations which have been described in FIGS. 5A and 5B, so a detailed description thereof will be omitted herein.

Although FIG. 5C illustrates still another example of a process of redetermining a BLE scan period in a mobile device in a wireless communication system according to an embodiment of the present disclosure, various changes could be made to FIG. 5C. For example, although shown as a series of operations, various operations in FIG. 5C could overlap, occur in parallel, occur in a different order, or occur multiple times.

Still another example of a process of redetermining a BLE scan period in a mobile device in a wireless communication system according to an embodiment of the present disclosure has been described with reference to FIG. 5C, and still another example of a process of redetermining a BLE scan period in a mobile device in a wireless communication system according to an embodiment of the present disclosure will be described with reference to FIG. 6.

Figure 6:
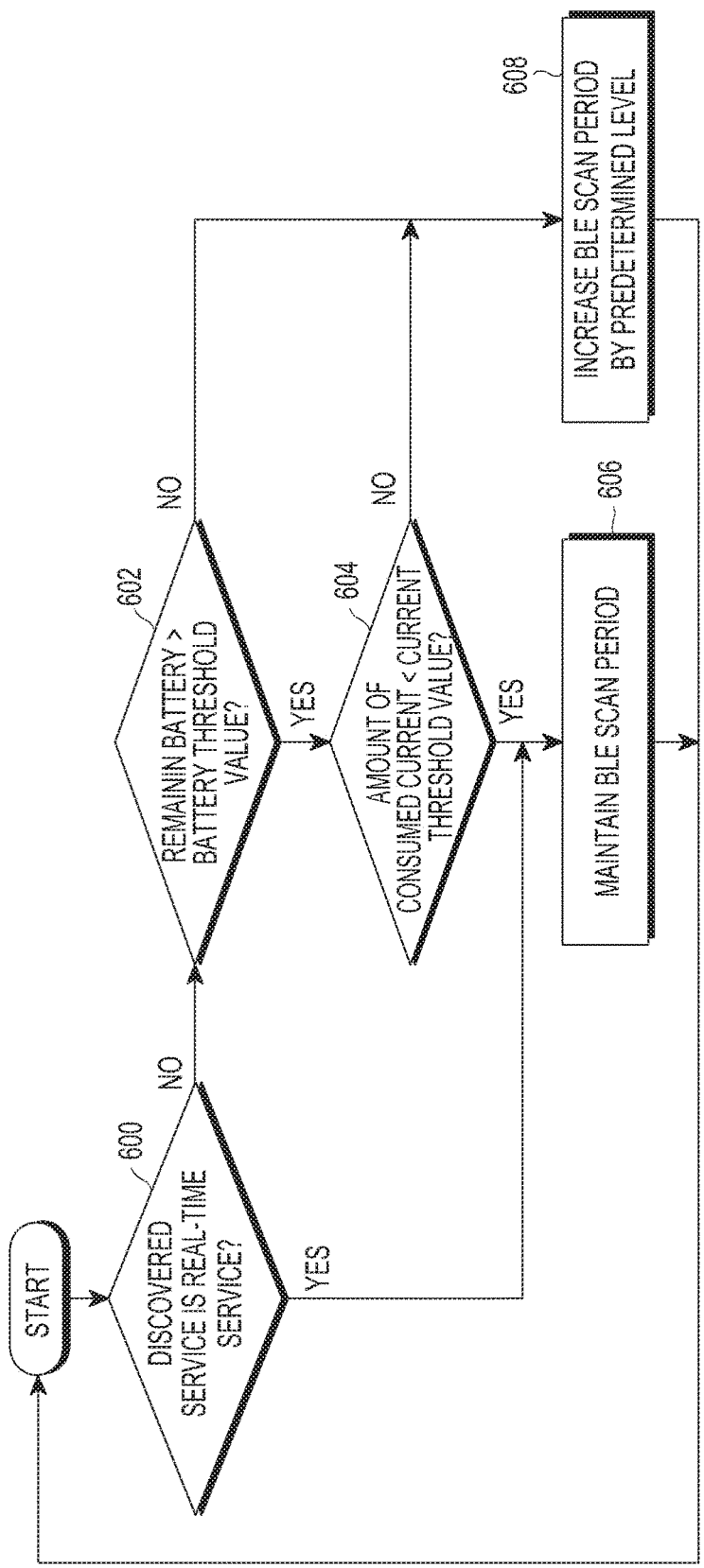
FIG. 6 schematically illustrates still another example of a process of redetermining a BLE scan period in a mobile device in a wireless communication system according to an embodiment of the present disclosure.

FIG. 6 schematically illustrates still another example of a process of redetermining a BLE scan period in a mobile device in a wireless communication system according to an embodiment of the present disclosure.

Referring to FIG. 6, it will be noted that a process of redetermining a BLE scan period in a mobile device in FIG. 6 is a process of redetermining a BLE scan period in a mobile device in a case that the mobile device considers only remaining battery and consumed current of the mobile device as a criterion for redetermining a BLE scan period upon determining the BLE scan period.

In FIG. 6, after a connectable service is discovered through a BLE scan operation, a mobile device determines whether the discovered service is a real-time service in order to determine whether a BLE scan period of the discovered service is changeable at operation 600. If the discovered service is the real-time service, the mobile device proceeds to operation 606. The mobile device maintains a BLE scan period of a sub-connection at operation 606.

If the discovered service is not the real-time service, the mobile device proceeds to operation 602. The mobile device determines whether remaining battery of the mobile device is greater than predetermined battery threshold value at operation 602. If the remaining battery of the mobile device is less than or equal to the predetermined battery threshold value, the mobile device proceeds to operation 608. The mobile device increases the BLE scan period by a predetermined level, e.g., one level in order to minimize power consumption of the mobile device at operation 608.

If the remaining battery of the mobile device is greater than the predetermined battery threshold value, the mobile device proceeds to operation 604. Here, operation 604 is an operation of determining whether consumed current is temporarily increased due to an arbitrary operation in a case that the mobile device performs the arbitrary operation. The mobile device determines whether amount of consumed current of the mobile device is less than a predetermined current threshold value at operation 604. If the amount of the consumed current of the mobile device is greater than or equal to the predetermined current threshold value, the mobile device determines that consumed current is temporarily increased due to the arbitrary operation, and proceeds to operation 608. The mobile device increases the BLE scan period by a predetermined level, e.g., one level at operation 608.

If the amount of the consumed current of the mobile device is less than the predetermined current threshold value, the mobile device determines that consumed current is not temporarily increased due to the arbitrary operation, and proceeds to operation 606. The mobile device maintains a BLE scan period at operation 606.

Although FIG. 6 illustrates still another example of a process of redetermining a BLE scan period in a mobile device in a wireless communication system according to an embodiment of the present disclosure, various changes could be made to FIG. 6. For example, although shown as a series of operations, various operations in FIG. 6 could overlap, occur in parallel, occur in a different order, or occur multiple times.

Meanwhile, in another embodiment of the present disclosure, if there is a service which is being run through a Wi-Fi scheme, a BLE scan period may be maintained, or the BLE scan period may be increased by a predetermined level, or a BLE scan operation may be temporarily stopped.

In another embodiment of the present disclosure, if throughput of a Wi-Fi connection is greater than threshold throughput, or a transmission retry count of the Wi-Fi connection is greater than a threshold count, a BLE scan period may be increased by a predetermined level, or a BLE scan operation may be temporarily stopped.

In another embodiment of the present disclosure, whether a protocol used for transmitting and receiving a signal through a Wi-Fi connection is a transmission control protocol (TCP) or a user datagram protocol (UDP) may be a criterion for redetermining a BLE scan period.

Generally, a TCP is used on an application which requires a relatively high reliability, so a scan window may be set to a relatively short scan window and a scan interval may be set to a relatively scan interval such that a Wi-Fi connection is deactivated and throughput is fast recovered if the TCP is used on the Wi-Fi connection.

A UDP is used on an application which transmits relatively simple data at a relatively high data rate, so a scan window and a scan interval may be set to a relatively long scan window and a relatively long scan interval, respectively.

In another embodiment of the present disclosure, amount of data which is scanned through a BLE scan operation may be considered as a criterion for redetermining a BLE scan period. For example, if there is no data which is scanned during a corresponding scan window, a BLE scan period of a default level may be increased by a predetermined level. If there is data which is scanned during the corresponding scan window, the BLE scan period of the default level may be decreased by a predetermined level.

For another example, importance of data which is scanned through a BLE scan operation may be considered as a criterion for redetermining a BLE scan period. For example, if data which a mobile device does not require is received during a BLE scan period, a BLE scan period of a default level may be increased by a predetermined level. If data which the mobile device requires is received during the BLE scan period, the BLE scan period of the default level may be decreased by a predetermined level.

A criterion for redetermining a BLE scan period according to an embodiment of the present disclosure may be determined based on at least one of or a combination of at least two of various examples as described above. In various embodiments of the present disclosure, for convenience, it will be assumed that change in a BLE scan period includes change in at least one of a BLE scan interval and a BLE scan period.

An inner structure of a mobile device in a wireless communication system according to an embodiment of the present disclosure will be described with reference to FIG. 7.

Figure 7:
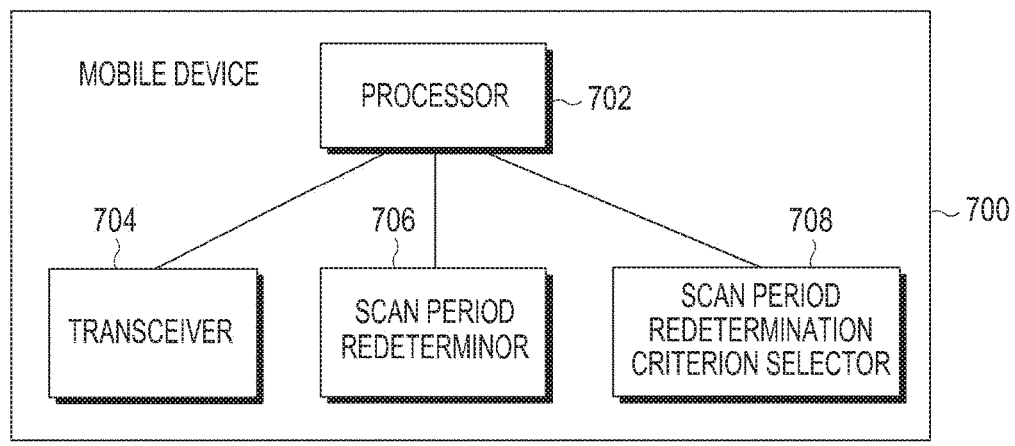
FIG. 7 schematically illustrates an inner structure of a mobile device in a wireless communication system according to an embodiment of the present disclosure.

FIG. 7 schematically illustrates an inner structure of a mobile device in a wireless communication system according to an embodiment of the present disclosure.

Referring to FIG. 7, a mobile device 700 includes, for example, a processor 702, a transceiver 704, a scan period redeterminor 706, and a scan period redetermination criterion selector 708.

An inner structure of the mobile device 700 as shown in FIG. 7 is only one example, and components included in the mobile device 700 may be varied according to intention of a provider or various embodiments.

According to an embodiment of the present disclosure, the processor 702 may activate a BLE function for detecting a signal for a connection with an external device and redetermine a BLE scan period according to criteria as described with reference to FIGS. 3, 4A, 4B, 5A to 5C, and 6. For this, the processor 702 determines whether a service which corresponds to a signal discovered during a BLE scan period is a real-time service, and determines to redetermine a BLE scan period if the service which corresponds to the discovered signal is not the real-time service.

As described in FIGS. 5A to 5C, and 6, the scan period redetermination criterion selector 708 may determine one of or a combination of two or more of whether a main connectivity scheme of the mobile device 700 is activated, that is, whether a main connectivity is on, state information of the main connectivity scheme, remaining battery of the mobile device 700, and a use history of scan information of the mobile device 700 as a criterion for redetermining the BLE scan period. Further, the scan period redetermination criterion selector 708 may determine amount of data detected during a BLE scan period, and importance of the detected data as the criterion for redetermining the BLE scan period.

The scan period redeterminor 706 may determine to change a BLE scan period by comparing a criterion selected from the scan period redetermination criterion selector 708 with a predetermined threshold value. Here, a changing operation has been described with reference to FIGS. 5A to 5C and 6, and a detailed description thereof will be omitted herein.

The transceiver 704 detects a signal of a sub-connection according to a BLE scan period redetermined by the scan period redeterminor 706.

While the processor 702, the transceiver 704, the scan period redeterminor 706, and the scan period redetermination criterion selector 708 are described in the mobile device 700 as separate units, it is to be understood that this is merely for convenience of description. In other words, the processor 702, the transceiver 704, the scan period redeterminor 706, and the scan period redetermination criterion selector 708 may be incorporated into a single unit.

Further, the mobile device 700 may be implemented as a form including a transmitter, a processor, a receiver, and a memory.

The processor controls the overall operation of the mobile device 700. More particularly, the processor controls an operation of controlling a scan period according to an embodiment of the present disclosure including an operation of controlling a scan period to detect a signal for a short range communication by considering a service which is being used in the mobile device 700, an operation of adaptively controlling a scan period to detect a signal for a short range communication by considering state information of a service being used, remaining battery of the mobile device 700, a use history for scan information of the mobile device 700, and/or the like. The operation of controlling the scan period according to an embodiment of the present disclosure has been described with FIGS. 1, 2, 3, 4A, 4B, 5A to 5C, and 6, and a detailed description thereof will be omitted herein.

The transmitter transmits various signals and various messages to other device, a device, and/or the like under a control of the processor. The various signals and various messages transmitted in the transmitter have been described with reference to FIGS. 1, 2, 3, 4A, 4B, 5A to 5C, and 6, and a detailed description thereof will be omitted herein.

The receiver receives various signals and various messages from the other device, the device, and/or the like under a control of the processor. The various signals and various messages received in the receiver have been described with reference to FIGS. 1, 2, 3, 4A, 4B, 5A to 5C, and 6, and a detailed description thereof will be omitted herein.

The memory stores various programs, various data, and/or the like related to the operation of controlling the scan period according to an embodiment of the present disclosure including the operation of controlling the scan period to detect the signal for the short range communication by considering the service which is being used in the mobile device 700, the operation of adaptively controlling the scan period to detect the signal for the short range communication by considering the state information of the service being used, the remaining battery of the mobile device 700, the use history for the scan information of the mobile device 700, and/or the like.

The memory stores various signals and various messages which are received by the receiver from the other mobile devices, the device, and/or the like.

A case that the mobile device 700 is implemented with separate units such as the transmitter, the processor, the receiver, and the memory has been described above, however, the mobile device 700 may be implemented as a form in which two or more of the transmitter, the processor, the receiver, and the memory are incorporated into a single unit.

The mobile device 700 may be implemented with at least one processor.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc (CD)-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD), a magnetic disk, a magnetic tape, and/or the like). A method and apparatus according to an embodiment of the present disclosure may be implemented by a computer or a mobile terminal that includes a processor and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a transceiver for performing a wired or a wireless communication with a graphic processing device, and a processor for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a scan period in a mobile device in a wireless communication system, the method comprising:

identifying a service through a scan operation of a first connectivity scheme during a scan period of the first connectivity scheme;

determining that the scan period of the first connectivity scheme is changeable based on the identified service;

in response to the determining that the scan period of the first connectivity is changeable, detecting a state of a second connectivity scheme; and changing the scan period of the first connectivity scheme based on the detected state of the second connectivity scheme, wherein the state of the second connectivity scheme is determined based on at least one of a throughput of the second connectivity scheme or a transmission retry count for the second connectivity scheme.

2. The method of claim 1, wherein the determining that the scan period of the first connectivity scheme is changeable based on the identified service comprises determining that the scan period of the first connectivity scheme is changeable in response to a determination that the identified service is not a real-time service.

3. The method of claim 1, wherein the detecting of the state of the second connectivity scheme response to the determining that the scan period of the first connectivity scheme is changeable comprises determining whether a connection between the mobile device and another device through the second connectivity scheme is possible.

4. The method of claim 1, wherein the changing of the scan period of the first connectivity scheme based on the detected state of the second connectivity scheme comprises one of:

decreasing the scan period of the first connectivity scheme by a predetermined amount of time in response to a determination that a connection between the mobile device and another device through the second connectivity scheme is not possible, or increasing the scan period of the first connectivity scheme by a predetermined amount of time in response to a determination that the mobile device is connected to the other device through the second connectivity scheme and a service is using the second connectivity scheme.

5. The method of claim 1, wherein the changing of the scan period of the first connectivity scheme comprises the changing of the scan period of the first connectivity scheme based on at least one of a remaining battery of the mobile device, a consumed amount or current, a usage history for scan information of the first connectivity scheme, an amount of data scanned during the scan period, or an importance of the data scanned during the scan period.

6. The method of claim 1, wherein the first connectivity scheme uses a part of a used frequency band of the second connectivity scheme.

7. The method of claim 1, wherein the second connectivity scheme is deactivated during the scan period.

8. The method of claim 1, wherein each of the first connectivity scheme and the second connectivity scheme performs a time division multiplexing (TDM) communication operation on a same frequency band.

9. The method of claim 1, wherein the scan period of the first connectivity scheme includes a scan window as a time duration for scanning a signal detected through the first connectivity scheme and a scan interval as a period by which the scan window is repeated.

10. A mobile device in a wireless communication system, the mobile device comprising:

at least one processor configured to:
identify a service through a scan operation of a first connectivity scheme during a scan period of the first connectivity scheme, determine that the scan period of a first connectivity scheme is changeable based on the identified service, detect a state of a second connectivity scheme in response to the determination that the scan period of the first connectivity is changeable, and change the scan period of the first connectivity scheme based on the detected state of the second connectivity scheme; and a transceiver configured to perform a scan operation under a control of the at least one processor, wherein the state of the second connectivity scheme is determined based on at least one of a throughput of the second connectivity scheme or a transmission retry count for the second connectivity scheme.

11. The mobile device of claim 10, wherein the at least one processor is configured to determine that the scan period of the first connectivity scheme is changeable in response to a determination that the identified service is not a real-time service.

12. The mobile device of claim 10, wherein the at least one processor is configured to determine whether a connection between the mobile device and another device through the second connectivity scheme is possible in response to the determination that the scan period of the first connectivity scheme is changeable.

13. The mobile device of claim 10, wherein the at least one processor is configured to one of:

decrease the scan period of the first connectivity scheme by a predetermined amount of time in response to a determination that the connection between the mobile device and another device through the second connectivity scheme is not possible, or increase the scan period of the first connectivity scheme by a predetermined amount of time in response to a determination that the mobile device is connected to the other device through the second connectivity scheme and a service is using the second connectivity scheme exists.

14. The mobile device of claim 10, wherein the at least one processor is configured to change the scan period of the first connectivity scheme based on at least one of a remaining battery of the mobile device, a consumed amount of current, a usage history for scan information of the first connectivity scheme, an amount of data scanned during the scan period, or an importance of the data scanned during the scan period.

15. The mobile device of claim 10, wherein the first connectivity scheme uses a part of a used frequency band of the second connectivity scheme.

16. The mobile device of claim 10, wherein the second connectivity scheme is deactivated during the scan period.

17. The mobile device of claim 10, wherein each of the first connectivity scheme and the second connectivity scheme performs a time division multiplexing (TDM) communication operation on a same frequency band.

18. The mobile device of claim 10, wherein the scan period of the first connectivity scheme includes a scan window as a time duration for scanning a signal detected through the first connectivity scheme and a scan interval as a period by which the scan window is repeated.

* * * * *